US006367608B1

(12) United States Patent
Franceschi

(10) Patent No.: US 6,367,608 B1
(45) Date of Patent: Apr. 9, 2002

(54) DEVICE FORMING A MOVING HANDRAIL FOR AN ACCELERATED MOVING WALKWAY

(75) Inventor: Jean-Claude Franceschi, Toulon (FR)

(73) Assignee: Constructions Industrielles de la Mediterranee—CNIM (FR)

(*) Notice: Subject to any disclaimer, the term of this patent is extended or adjusted under 35 U.S.C. 154(b) by 0 days.

(21) Appl. No.: 09/553,275

(22) Filed: Apr. 20, 2000

(30) Foreign Application Priority Data

Apr. 25, 1999 (FR) .......................................... 99 05191

(51) Int. Cl.[7] .............................................. B65G 21/12
(52) U.S. Cl. ....................................... 198/335; 198/335
(58) Field of Search ................................ 198/334, 335, 198/337

(56) References Cited

U.S. PATENT DOCUMENTS 3,651,763 A * 3/1972 Iritani ......................... 104/25
3,672,484 A * 6/1972 Angioletti et al. ............ 198/16
3,799,060 A * 3/1974 Johnson ....................... 104/18
3,908,811 A * 9/1975 Cortese et al. ................ 198/16
4,053,044 A * 10/1977 Patin .......................... 198/334
4,197,933 A * 4/1980 Dunstan et al. ............. 198/334
4,240,537 A * 12/1980 Dustan ....................... 198/334
4,267,922 A * 5/1981 Patin et al. ................. 198/851
4,284,191 A * 8/1981 Lavau ........................ 198/792
4,462,514 A * 7/1984 Dunstan ..................... 198/334
5,339,938 A * 8/1994 Patin .......................... 198/334
6,065,583 A * 5/2000 Hoashi et al. .............. 198/334

FOREIGN PATENT DOCUMENTS

CH 397999 2/1966
EP 0576353 12/1993
FR 2274523 1/1976

* cited by examiner

*Primary Examiner*—Christopher P. Ellis
*Assistant Examiner*—Khoi H. Tran
(74) *Attorney, Agent, or Firm*—Bachman & LaPointe, P.C.

(57) ABSTRACT

The present invention relates to a device forming a moving handrail for an accelerated moving walkway. The device including a rail which carries backing carriages and which converges towards the rail carrying the carriages that support the handrail handholds in a zone situated between the divergence zone and the turn-around zone; in at least the divergence zone, said rail follows a cam outline having an oscillatory profile in which the length of each wave is equal to the distance between a first one and a third one of the consecutive backing carriages, each placed at a respective end of the wave that they flank.

11 Claims, 3 Drawing Sheets

DEVICE FORMING A MOVING HANDRAIL FOR AN ACCELERATED MOVING WALKWAY

BACKGROUND OF THE INVENTION

A known type of such a device is shown in FIG. 1 which shows that portion of the handrail which is situated at either end of the walkway and whose principle is described in Patent Application FR 2 274 523.

In that known device, the handrail comprises: handrail handholds 1 mounted on respective carriages 2 whose wheels 3 move between rollway and guideway rails 4; and a handrail element 6 constituted by a flexible link interconnecting two successive carriages 2 by passing over two direction-changing members 7, such as pulleys or cogs, carried by the axles 8 of the wheels 3 of the carriages 2 so that the flexible link element 6 folds over substantially at right angles facing each corresponding handhold 1. The two ends of each flexible element 6 are connected to respective ones of two backing carriages 9 mounted to move on rollway and guideway rails 10 which are maintained at a distance from the rollway and guideway rails 4 for the carriages 2 that varies so that the spacing between the handholds 1 varies, thereby varying their speed, i.e. the handholds 1 can move apart in an acceleration zone B situated at one end of the walkway (at the entrance end), can come closer together in a deceleration zone B situated at the other end of the walkway (at the-exit end), and can remain equidistant in a constant-speed zone between the acceleration zone B and the deceleration zone B, thereby forming a moving handrail that it is desirable to make "synchronous" with the moving floor of the walkway, which was not the case prior to the present invention.

Each of the sides of the moving walkway is equipped with a moving handrail, and, in the zone A in which the handrail moves at constant speed V, which zone covers most the walkway, the backing carriages 9 meet the carriages 2 carrying the handholds 1 because the guideway rails 10 are very close to the rails 4 and the flexible link elements 6 are spaced apart in a manner such that the distance between two successive handholds 1 is at its maximum. If $\underline{d}$ designates the distance from the middle of one handhold 1 to the middle of the next handhold 1, said distance varies in the acceleration and deceleration zones B. If $\underline{v}$ is the minimum speed of the handholds 1 both at the entrance to the acceleration zone B and at the exit from the deceleration zone B, and if V is the maximum speed of said handholds in the constant-speed zone A, with the ratio V/v being equal to K, the smallest value of the distance between the handholds 1 at the entrance to or at the exit from the zones B of the walkway is equal to d/K. By way of example, if, for a moving walkway, V=3 meters per second (m/s) and v=0.75 m/s, then the ratio K=4, and for d=2 meters, the minimum distance between handholds is then d/4=0.5 at the entrance to and at the exit from the walkway.

Each of the rails 4 for guiding the carriages 2 carrying the handholds 1 and each of the rails 10 for guiding the backing carriages 9 forms a loop with, at each end of the walkway a device for turning the handrail around making it possible to return the handholds from one end of the walkway to the other. In the constant-speed zone A, the rails 4 and 10 are parallel to the moving floor P of the walkway, and the handholds 1 and the flexible link elements 6 constituting the top run of the handrail are at a determined height relative to said floor. In this zone A, the backing carriages 9 are engaged in the carriages 2. In the acceleration or deceleration zone B, the backing carriages 9 roll along a portion of the guideway rail 10 that has a cam profile whose shape governs the relative movement of the successive handholds, i.e. the speed relationship that applies to them. The handrail turns around from the top run to the bottom or loop-return run by means of a circular rotation due to the circularly arcuate configuration of the rails 4 and 10, while maintaining the handholds 1 at their minimum relative distance at the exit from the deceleration zone or at the entrance to the acceleration zone.

Such a configuration suffers from the drawback of being excessively voluminous because of the large diameter ϕ of the circular path of the handholds as each end of the handrail turns around. It is therefore necessary to provide a relatively deep pit for receiving the turn-around end portion. For example, in the above case, when the distance between the spaced-apart handholds in the constant maximum speed zone is 2 m and becomes 0.5 m at the entrance to or at the exit from the walkway, with the distance between the handholds and the backing carriages then being 0.75 m in the turn-around zone, the diameter ϕ of the circular trajectory of the handholds during the turn-around is at least a minimum of 2.5 m or even 3 m, given the overall size of the successive backing carriages.

OBJECTS AND SUMMARY OF THE INVENTION

The problem posed is firstly to obtain genuine synchronization between the handrails and the moving floor of the walkway in the acceleration and deceleration zones which, for reasons of comfort and of optimizing the forces on the mechanical systems, must be zones of constant acceleration and deceleration, and secondly to overcome the above-mentioned drawback in the turn-around zones so as to minimize the turn-around height within which the handrail handholds are turned around.

The invention solves the problem posed by means of a device forming a moving handrail for an accelerated moving walkway, which handrail comprises N handholds mounted on carriages that move over at least one rollway and guideway rail, and flexible link elements of the same length L, each of which interconnects two consecutive carriages, folding over facing said carriages via a direction-changing member, and anchored at both ends to two backing carriages that move over at least one other guideway and rollway rail situated at a distance from the rail carrying the carriages that varies so as to accelerate and decelerate said carriages between a given maximum speed and a given minimum speed, each of said rails being shaped into a loop whose bottom run and top run are rectilinear and mutually parallel respectively in a bottom zone E and a top zone A corresponding to at least a portion of their length, and their end portions F are curved and serve to turn around the assemblies comprising the handholds, the link elements, and the backing carriages, the guideway and rollway rail for the backing carriages diverging, beyond the top zone A, away from the guideway and rollway rail for the carriages in a zone B situated before each end portion F of their top runs; according to the invention said rail carrying the backing carriages converges towards the rail carrying the carriages in a zone D situated between the divergence zone B and the turn-around zone F, and, in at least the divergence zone B, follows a cam outline having an oscillatory profile in which the length of each wave $B_i$ is equal to the distance between a first one and a third one of the consecutive backing carriages, each placed at a respective end of the wave that they flank.

Preferably, at each end of each wave, the slope of the profile of the cam outline of the rail carrying the backing carriages is parallel to the slope of the segment of the rail carrying the carriages that is situated in the same transverse plane intersecting the end of the corresponding wave and perpendicular to the two rails; in addition, the number of handholds situated between the beginning and the end of each divergence zone B is odd, and, when a first handhold is positioned at one end, the last handhold is positioned at the other end of the same zone.

Since it is possible to use such a fast moving walkway of the invention in either direction of traffic flow, the zone B which is the acceleration zone in one direction naturally becomes the deceleration zone B in the other direction and vice versa. For this purpose, in the present invention, said cam outlines of the rail carrying the backing carriages are the same at each end of the handrail device at least in the divergence zone B.

In a preferred embodiment, the top run and the bottom run of the loop of the rail carrying the carriages are parallel, and the device is provided with a horizontal safety zone C situated between each divergence zone B and convergence zone D.

The result is a novel handrail-forming device which overcomes the problems posed firstly by providing all the desired comfort and safety for users of the moving walkway of the invention, and secondly by optimizing the implementation of the mechanical means by minimizing their dimensions and the forces that they need to withstand.

BRIEF DESCRIPTION OF THE DRAWINGS

The invention will be better understood and other objects, characteristics, details, and advantages of the invention will appear more clearly on reading the following explanatory description given with reference to the accompanying diagrammatic drawings which are given merely by way of example, which show two embodiments of the invention, and in which.

MORE DETAILED DESCRIPTION

Figure 1:
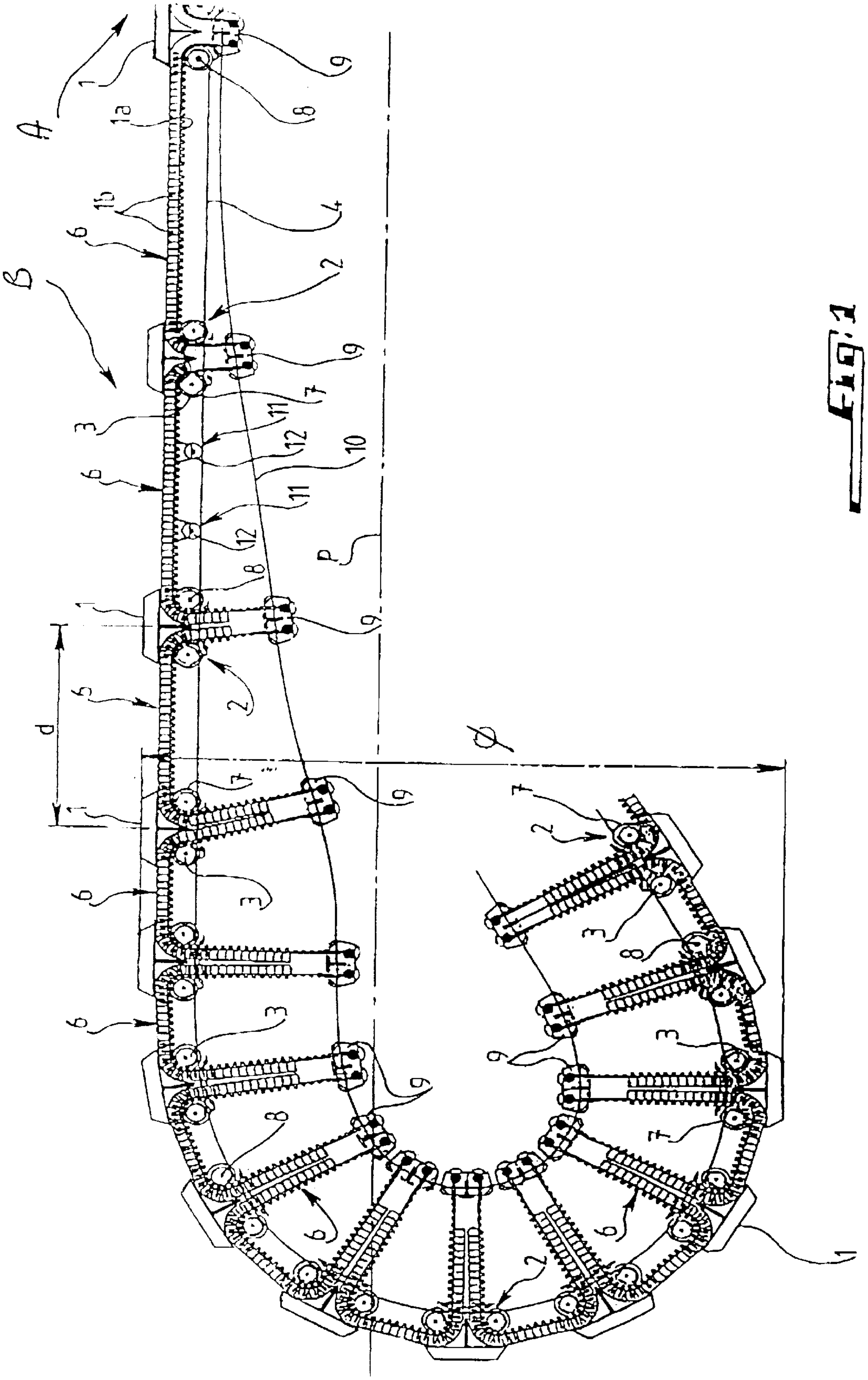
FIG. 1 shows the turn-around end portion of a prior art handrail for an accelerated moving walkway.
Figure 2:
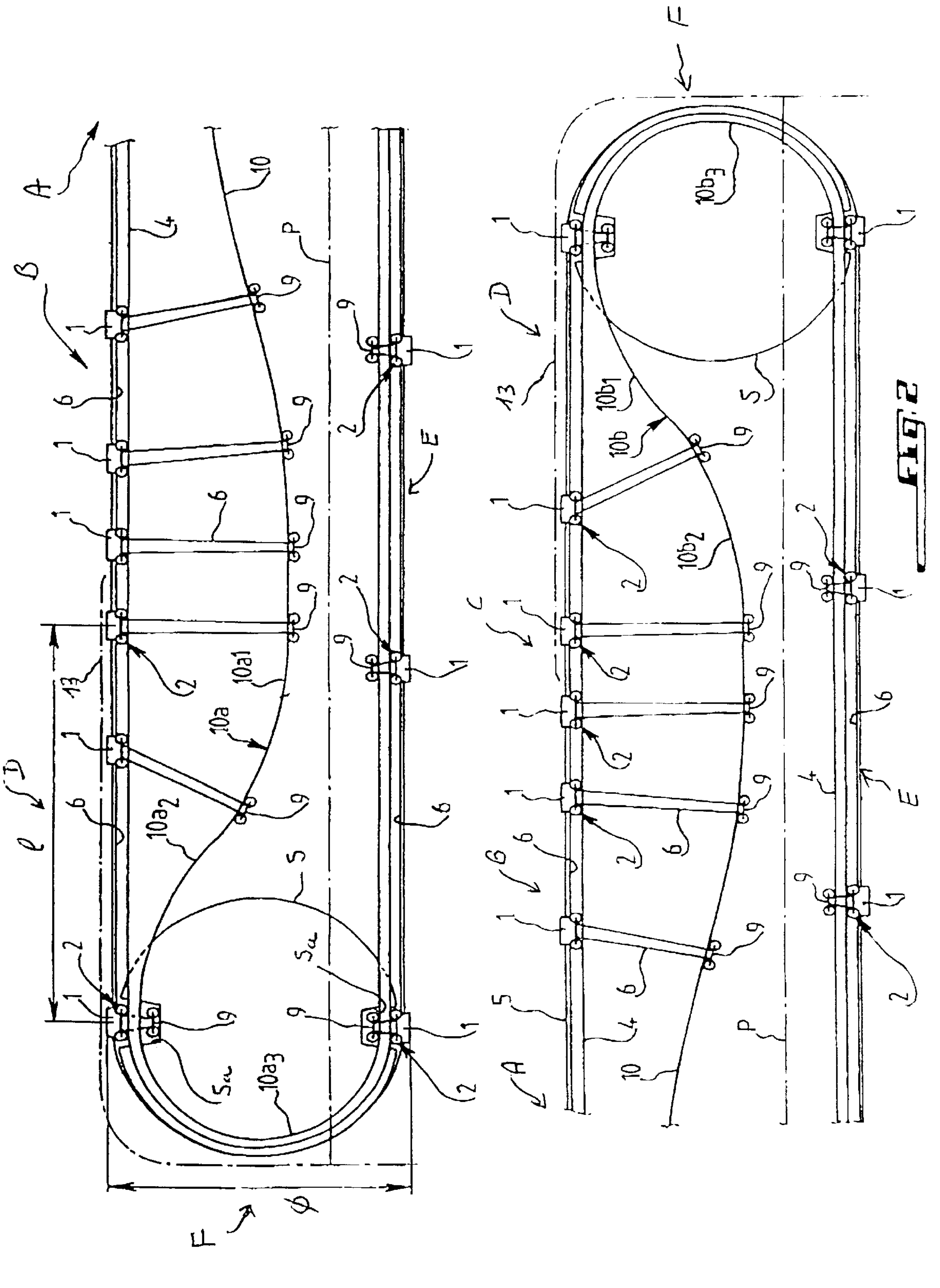
FIG. 2 shows a first embodiment of the handrail-forming device of the invention.
Figure 3:
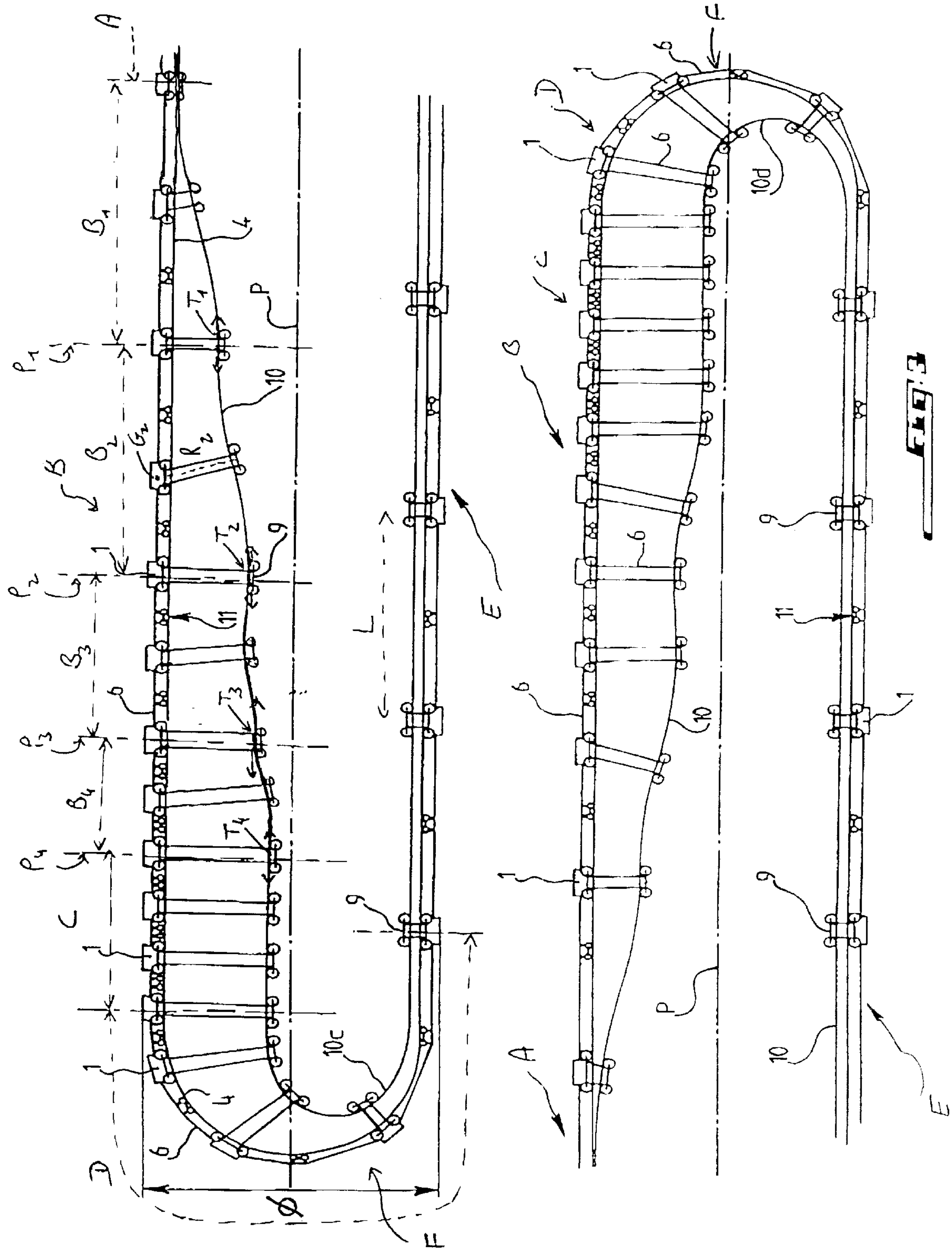
FIG. 3 shows a second embodiment of the handrail-forming device of the invention.

The handrail which is described with reference to FIGS. 2 and 3 is generally of the same configuration as the known handrail shown in FIG. 1, so that those elements of the handrail in FIGS. 2 and 3 which are common to the handrail shown FIG. 1 are given like references.

Furthermore, the handrail shown in FIG. 1 is described in European Patent No. 0 567 353 whose contents are incorporated into the present application by way of reference.

Thus, without going into detail, it is indicated that each flexible link element 6 may be constituted by a cog belt 1*a* (FIG. 1) via which blocks 1*b* are fixed, the shape of the blocks making it possible for two contiguous blocks to be mutually engaged, the front face of each block being provided with a projection and its rear face being provided with at least one recess complementary to the projection so that, in the rectilinear portion of the link between the two pulleys, each projection on the front face of a block 1*b* engages in a complementary recess in the facing rear face of the adjacent block, thereby forming a tenon-and-mortice joint capable of withstanding the shear forces applied to the link, the projections' coming out of the recesses in the convex portions of the link.

Naturally, the flexible link element 6 may be constituted other than as described in the above-mentioned prior art patent, e.g. it may be constituted by a cable.

FIGS. 2 and 3 show the two ends of a moving walkway, which ends are identical so as to enable the walkway to be reversible: to avoid any confusion in defining the acceleration and deceleration zones which firstly may be inverted depending on the direction in which the walkway advances, and which secondly may coincide in the zones in which the handholds are also accelerated and decelerated before or during the turn-around, the zones are referred to as follows in the present description;

the acceleration or deceleration zones B are referred to as "divergence" zones in which the guideway and rollway rails 10 for the backing carriages 9 diverge away from the guideway and rollway rails 4 for the carriages 2 carrying the handholds 1, beyond the ends of the constant maximum speed zone A; and the above-defined zones D before or in the turn-around portion F, which zones are either zones in which the handrail is speeded up or zones in which said handrail is slowed down, are referred to as "convergence" zones in which the rails 10 carrying the backing carriages 9 converge towards the rails 4 carrying the carriages 2.

In the invention, in the zones D, the rails 10 for is guiding the backing carriages 9 have a cam outline 10*a*, 10*b*, 10*c*, 10*d* such that they converge progressively towards the rail for guiding the carriages carrying the handholds 1, from the divergence zones B to the bottom zone E in which the handrail handholds 1 move as spaced apart by a relatively-constant distance which is substantially equal to the distance between the handrail handholds moving in the maximum constant speed zone A.

In the embodiment shown in FIG. 2, the rail 10 carrying the backing carriages 9 converges towards the rail 4 carrying the carriages 2 until said backing carriages 9 are as close as possible to the corresponding carriages 2, before the turn-around zone F and following a convex profile $\mathbf{10}_{a2}$ of the cam outline that extends a concave portion $\mathbf{10}_{a1}$, itself following on from the cam profile of the divergence zone B and then of the safety zone C, and that joins up with the beginning of the circular arc shape $\mathbf{10}_{a3}$ of the turn-around curve, and the flexible link elements 6 situated between two consecutive handholds 1 wind around a wheel 5 matching the shape of the turn-around portion. In this embodiment, the re-acceleration for speeding up the handrail handholds, or, at the other end of the walkway, the deceleration for slowing them down, is performed before or respectively after the handrail has been turned around, as efficiently as possible with a minimum number of links 6 that is two, which represents a length 1 of the zone D that is substantially equal to 3 m for an overall diameter $\phi$ of the circle formed by the guideway rails 4 and 10 of about 1.30 m.

FIG. 2 also shows that the link or flexible link element 6 between two consecutive re-accelerated handrail handholds 1 is wound around a pulley wheel 5 which may be a drive wheel for driving the handrail, and which is provided with two substantially diametrically opposite recesses 5*a*, each of which receives an assembly constituted by a carriage 2 carrying a handrail handhold 1 and by a backing carriage 9 engaged in the carriage 2 and, where applicable, as shown in the embodiment of FIG. 3, by two intermediate carriages 11. The circularly arcuate turn-around portion of the rails 4 for guiding the carriages 2 hugs the pulley wheel 5.

The cam outline 10*a* and the pulley wheel 5 are made inaccessible to passengers transported by the floor P of the moving walkway by being masked by protective cladding 13 that is represented diagrammatically by a dot-dashed line in FIG. 2 and that starts at the exit from the walkway in the vicinity of the landing plate and that extends over the safety zone C and the zone D to the turn-around zone F. The horizontal safety zone C differs from the safety zone known in current constant-speed walkways, such a known zone not containing variable-length handrail elements and providing safety only in the bottom portion of the vertical portion of the turn-around zone F.

As indicated above, the end of the walkway that corresponds to the entrance thereto and its end that corresponds to its exit as defined above are identical, and the device of the invention as shown in FIG. 2 makes it possible, as explained above, to reduce the overall diameter $\phi$ of the wheel 5 to a value of about 1.30 m, thereby leading to a substantial reduction in the depth of the pit that is then only about 0.30 m deep relative to the floor P of the moving walkway which is itself situated at about 1 m below the top run of the handrail 1.

In the embodiment shown in FIG. 3, the rail 10 carrying the backing carriages 9 converges towards the rail 4 carrying the carriage 9 until said backing carriages are as close as possible to the corresponding carriages 2 in the turn-around zone F and following a convex cam outline profile which constitutes at least a portion of the turn-around curve of said rail 10, and the end portion providing the turn-around of the rail carrying the carriages is circularly arcuate.

In this embodiment, like the shape of the convergence cam 10*a* or 10*b* in FIG. 2, the shape of the turn-around cam 10*c* or 10*d* of the guideway rail can be implemented by the person skilled in the art using any profile corresponding to the present invention (without it being necessary to specify the characteristics any further in the present description) and making it possible to re-accelerate or to slow down the handrail handholds 1 within a minimum distance: in this zone there is no need for acceleration and deceleration to be constant and low for the comfort of passengers, as in the zones B, which makes it possible to reduce the overall diameter $\phi$ of the circularly arcuate turn-around portion of the rails 4 for guiding the carriages 2: in the embodiment in FIG. 3, this diameter $\phi$ may be about 2 m, leading to a pit depth of about 1 m below the floor P on which the passengers are transported. This depth, while it is greater than the pit depth in the embodiment shown in FIG. 2, is nevertheless less than the pit depth of the prior art device shown in FIG. 1.

In the invention the turn-around end portions of the handrail described above with reference to FIGS. 2 and 3 are thus organized firstly so that returning the handrail from one end of the walkway to the other end thereof involves as small a number of handrail handholds as possible, and secondly so that, compared with the turn-around zones of the prior art handrail shown in FIG. 1, there is a considerable reduction in the depth of the pit in each turn-around zone that is situated below the moving floor on which the passengers are transported.

In at least the zones A and E of their rectilinear portions corresponding to the maximum drive speed after the carriages 2 and the backing carriages 9 have been accelerated, the rails 4, 10 carrying the carriages 2 and the backing carriages 9 are situated equidistant from each other. In addition, especially when the length L of the flexible links between the carriages 2 is long, the device includes intermediate carriages 11 situated between two successive handrail handholds 1 and secured to each flexible link element 6. These intermediate carriages 11 whose support wheels 12 can move along the guideway and rollway rails for the carriages 2 supporting the handrail handholds 1 can thus guide the handrail better, especially over curves when the gradient in the trajectory of the fast walkway changes, so that the flexible links 6 hug more closely to the shape of the curve between two carriages 1.

Since, in order to improve the comfort of the passengers and the mechanical strength of the elements making up the device, it is desirable to provide acceleration or deceleration that is constant over at least a large portion of each of the divergence zones B in which the guideway and rollway rails 10 carrying the backing carriages 9 diverge away from the rails 4 carrying the carriages 2, the cam outline of the rail 10 in said zone follows, as indicated above, an oscillatory profile in which the length of each wave $B_i$ (four waves $B_1$ to $B_4$ are shown in FIG. 3) is equal to the distance between a first one and a third one of the consecutive backing carriages 9, each placed at a respective end of the wave that they flank: the length of each of the waves thus decreases as the carriages 2 slow down, due to the progressive divergence of the rails.

In addition, the slope $T_i$ of the profile of the cam outline of the rail 10 carrying the backing carriages 9 is parallel to the slope of the segment of the rail 4 carrying the carriages 2 that is situated in the same transverse plane $P_i$ intersecting the end of the corresponding wave $B_i$ and perpendicular to the two rails 4, 10; and the number of handholds 1 situated between the beginning and the end of each divergence zone B is odd, i.e., for example, nine, as in FIG. 3, and, when a first handhold 1 is positioned at one end, the last handhold is positioned at the other end of the same zone.

On the basis of the above definitions, there exist a plurality of types of acceleration/deceleration cam of the present invention that make it possible to go from a constant maximum speed V in the constant-speed zones A and E upstream from the entrance and downstream from the exit, to or from a given minimum speed $\underline{v}$, following a given constant acceleration/deceleration. Given that any handhold 1 must correspond to a backing carriage 9 whose static equilibrium property for reducing the forces thereon is that the flexible link 6 that interconnects them must be orthogonal to the profile of the cam of the rail 10, it can be stated that said cam is the envelope of the circles of centers $G_n(t)$ and of radius $R_n(t)$; where $\underline{t}$ varies in the range 0 to $\tau$ which is the period of time that elapses between the passage of two consecutive handholds at the same place; the value of the radius $R_n$ being the distance between each handhold 1 and its associated backing carriage 9, and the center $G_n$ of each circle being the position of the handhold 1 in question.

If the maximum length between two handholds 1 is considered to be the length L of the flexible element 6 that interconnects them, and if the number of handholds M present at the same time in the acceleration/deceleration or divergence zone B is taken to be such that M=2P+1 (where P is in fact the number of waves $B_i$), it is possible, on the basis of the characteristics of the present invention, to determine constants related to the minimum speed v and to the maximum speed V that are such that;

$$k_v=V_{max}/v_{min}$$

$$k_0=v_{min}\times V_{max}\times(k_v-1)/2$$

$$K_1=V_{max}-v_{min}\times(k_v-1)/2$$

then this gives an acceleration/deceleration value $y(p)=K_0/(P\times L)$ and a deceleration or acceleration length equal to the length of the zone B, $d(p)=2\times P\times\tau\times K_1$ i.e. for a value given by way of example of L=2 m and a maximum speed V=3 m/s and $v_{min}$ of 0.75 m/s, for P=4 i.e. a number of handholds M=9, and a period τ=L/V ⅔ second, the following is obtained:

a deceleration γ=0.4218 m/s and an acceleration or deceleration length d=10 m.

What is claimed is:

1. A moving handrail for an accelerated moving walkway which comprises:

a plurality of handholds mounted on upper carriages which move over at least one rollway and guideway rail;

flexible link elements connecting two consecutive upper carriages, each of said link elements having a common length;

a direction-changing member associated with each said flexible link element for enabling each said flexible link element to fold over and face said upper carriages to which said flexible link element is connected;

each said flexible link element being anchored to two backing carriages that move over at least one other rollway and guideway rail situated at a distance from the at least one rollway and guideway rail;

said distance between said at least one rollway and guideway rail and said at least one other rollway and guideway rail varying so as to accelerate and decelerate said upper and backing carriages between a maximum speed and a minimum speed;

each of said rails being shaped into a loop having a bottom run and a top run extending along a portion of the loop, said bottom run and top run being rectilinear and mutually parallel respectively in a bottom zone and a top zone;

each of said rails having curved end portions which define turn around zones for turning around assemblies comprising said handholds, said link elements, and the backing carriages;

a divergence zone in which said at least one other rollway and guideway rail diverges away from said at least one rollway and guideway rail, said divergence zone being situated beyond the top zone and before each turn around zone;

a convergence zone in which said at least one other rollway and guideway rail converges toward said at least one rollway and guideway rail;

a horizontal safety zone situated at both ends of the top zone and between each divergence zone and each convergence zone;

said at least one other rollway and guideway rail in at least said divergence zone following a cam outline having an oscillatory profile defined by first, second and third backing carriages in which each wave in said profile has a length equal to a distance between said first backing carriage and said third backing carriage with said first backing carriage flanking a first end of said wave, said third backing carriage flanking a second end of said wave, and said second backing carriage being located about a middle of said wave; and said upper and backing carriage moving at maximum speed in the top zone.

2. A handrail according to claim 1, wherein, at each end of each wave, the cam outline has a profile slope parallel to the slope of a segment of the at least one rollway and guideway rail that-is situated in a transverse plane intersecting the respective end of the wave and perpendicular to the rollway and guideway rails.

3. A handrail according to claim 1, further comprising: an odd number of handholds situated between a beginning and an end of each divergence zone; and each divergence zone having a first one of said handholds positioned at one end of said divergence zone when a last one of said handholds is positioned at a second end of said divergence zone.

4. A handrail according to claim 1, wherein each turn around zone has a turn-around curve with a circular arc shape, the at least one other rollway and guideway rail converges toward the at least one rollway and guideway rail until said backing carriages are as close as possible to said upper carriages adjacent each turn around zone and follows a convex profile of the cam outline which loins a beginning portion of said circular arc shape of the turn-around curve, and the flexible link elements situated between two consecutive handholds wind around a pulley wheel which matches the shape of a respective turn-around zone.

5. A handrail according to claim 4, wherein the pulley wheel is provided with two substantially diametrically opposite recesses and each of said recesses receives a respective assembly made up of an upper carriage carrying one of said handholds and a backing carriage.

6. A handrail according to claim 1, wherein the handrail has a curved turn around portion, the at least one other rollway and guideway rail converges toward the at least one rollway and guideway rail until the backing carriages are as close as possible to corresponding upper carriages and thereafter follows a convex profile of the cam outline which constitutes at least a portion of the turn around curve of the handrail, and the at least one rollway and guideway rail having an end portion which is circularly arcuate.

7. A handrail according to claim 1, further comprising: a divergence zone at each end of the handrail; and the cam outlines of the at least one other rollway and guideway rail are the same in each said divergence zone.

8. A handrail according to claim 1, wherein the top run and the bottom run of the loop of the at least one rollway and guideway rail are parallel.

9. A handrail according to claim 1, wherein the at least one rollway and guideway rail and the at least one other rollway and guideway rail are mutually equidistant at least in zones of their rectilinear portions, corresponding to the maximum drive speed, after acceleration, of the upper carriages and the backing carriages.

10. A handrail according to claim 1, including at least one intermediate carriage between two successive handrail handholds, and said at least one intermediate carriage being secured to each flexible link element and being mounted to move over the at least one rollway and guideway rail for supporting the handrail handholds.

11. A handrail according to claim 1, further comprising: a horizontal safety zone situated between each divergence zone and each convergence zone.

* * * * *

UNITED STATES PATENT AND TRADEMARK OFFICE

CERTIFICATE OF CORRECTION

PATENT NO. : 6,367,608 B1
DATED : April 9, 2002
INVENTOR(S) : Jean-Claude Franceschi It is certified that error appears in the above-identified patent and that said Letters Patent is hereby corrected as shown below:

Column 8,
Line 4, "that-is" should read -- that is --.
Line 20, "loins" should read -- joins --.

Signed and Sealed this

Sixteenth Day of July, 2002

*Attest:*

JAMES E. ROGAN

*Attesting Officer*

*Director of the United States Patent and Trademark Office*